Feb. 6, 1934.                L. C. COLE                1,945,598
                          LATHE HEADSTOCK
                       Filed March 27, 1931            2 Sheets-Sheet 1
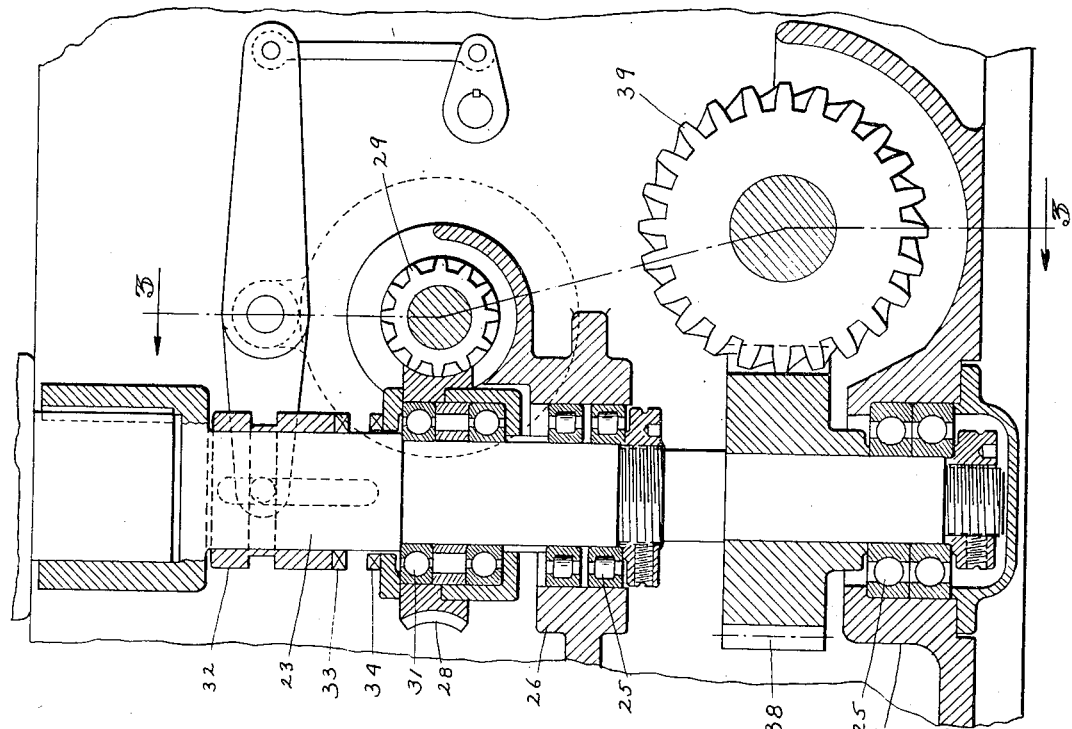
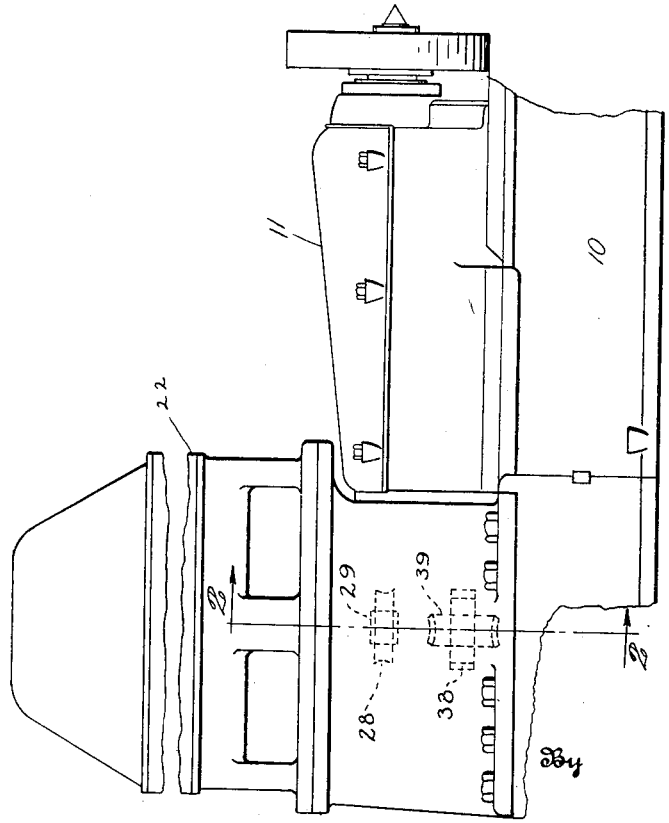
Inventor
Lyndon C. Cole
By Maréchal & Noe
Attorney Feb. 6, 1934.    L. C. COLE    1,945,598
LATHE HEADSTOCK
Filed March 27, 1931    2 Sheets-Sheet 2

Inventor
Lyndon C Cole
By Marechal & Noe
Attorney

Patented Feb. 6, 1934

1,945,598

UNITED STATES PATENT OFFICE 1,945,598

LATHE HEADSTOCK

Lyndon C. Cole, Hamilton, Ohio, assignor to General Machinery Corporation, Hamilton, Ohio, a corporation of Delaware Application March 27, 1931. Serial No. 525,736

5 Claims. (Cl. 82—29)

This invention relates to power lathes and the like.

One object of the invention is the provision of a lathe gear drive of simple construction providing for operation of the spindle shaft at several speeds with relation to the driving motor.

Another object of the invention is the provision, in a lathe or the like, of a drive between the motor and the lathe spindle providing for operation of the lathe spindle at speeds greater than motor speed.

Another object of the invention is the provision of a lathe drive incorporating a clutch and gear connection between the motor shaft and the spindle, and incorporating a second drive that is operable when the clutch is disengaged for coupling the motor shaft through a countershaft and gearing to the spindle for operation of the spindle at lower speeds.

Further objects and advantages of the invention will be apparent from the following description, the appended claims and the accompanying drawings, in which—

Fig. 1 is a front elevation of a portion of a lathe, embodying the present invention;

Fig. 2 is a vertical section on the line 2—2 of Fig. 1; and

Figure 3:
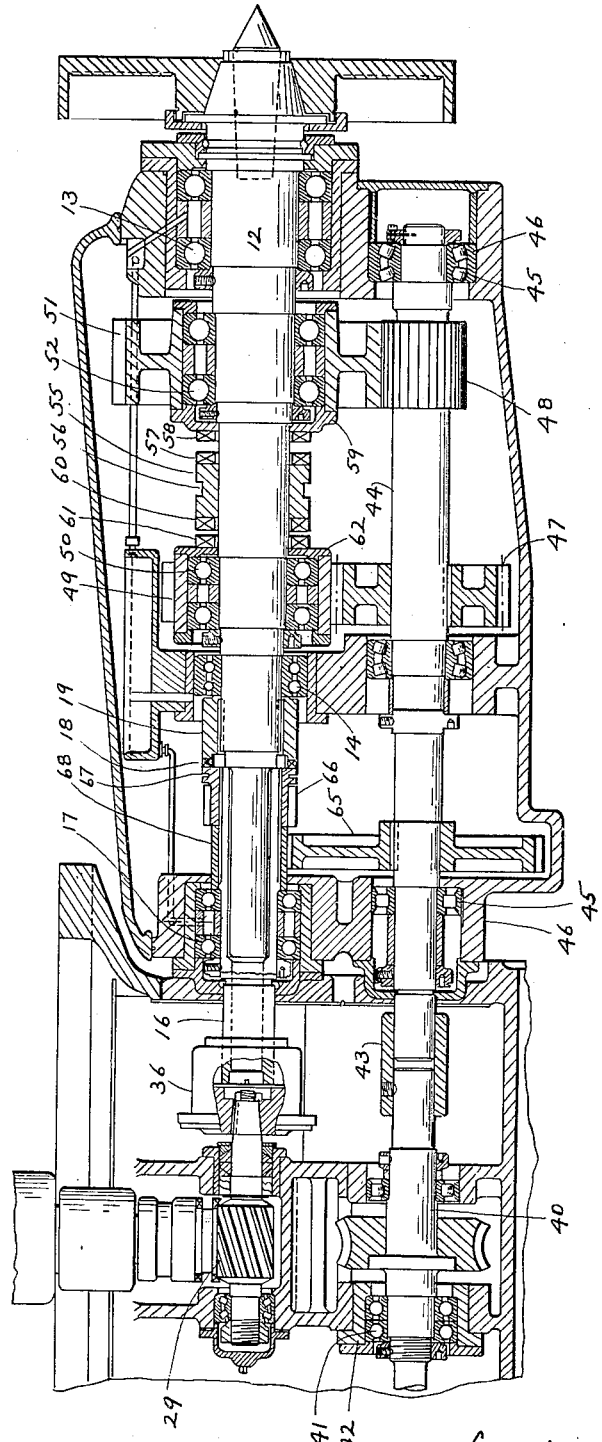
Fig. 3 is a longitudinal section showing the spindle drive, taken on the line 3—3 of Fig. 2.

Referring more particularly to the drawings in which similar numerals designate like parts in the various views, 10 designates the bed of a machine tool, such as a power lathe, on which is supported the headstock 11. Rotatably mounted in the headstock 11 is the spindle 12, antifriction bearings 13 and 14 being provided in suitable supporting walls of the headstock for the support of the spindle. The left-hand end of the spindle is normally fixed to a shaft 16 that is rotatably mounted in the left end of the headstock by means of suitable antifriction bearings 17. A clutch 18 interconnects the shaft 16 with a sleeve 19 that is keyed to the spindle so that the parts 16, 19 and 12 turn together.

The spindle 12 may be driven at several different speeds from the main drive motor 22 provided at the left of the headstock. As shown the motor 22 is a vertical motor, the motor shaft 23 extending downwardly through the motor supporting standard 24 where it is rotatably mounted in suitable antifriction bearings 25 provided in the bearing supports 26.

The motor shaft 23 can operate spindle 12 through shaft 16 by means of a worm wheel 28 and a worm 29, worm 29 being adapted to turn several times faster than the speed of the worm wheel 28 so as to drive the lathe spindle at a speed several times faster than the speed of the motor. This high-speed operation of the lathe spindle is particularly desirable when the lathe is used with high-speed or carboloy steel cutting tools and the like, for the time required for any cutting operations while employing these high-speed cutting tools is of course reduced if the spindle turns very rapidly.

The worm wheel 28 is freely mounted on the motor shaft 23 by a suitable antifriction bearing 31 but is adapted to be clutched to the motor shaft 23 by means of a clutch collar 32 slidably keyed on the motor shaft and adapted to be moved downwardly so that clutch teeth 33 provided on the clutch collar can engage clutch teeth 34 on the upper side of the worm wheel 28. When this clutch is engaged the worm wheel 28 is rotated at motor speeds, and as the worm wheel 28 meshes constantly with the worm 29 which is connected through a suitable shock-absorbing driving connection 36 to the shaft 16, the spindle 12 may be driven at its highest speed. Preferably means are employed to control the speed of the motor by variation of the motor field through suitable resistances, so that although the maximum spindle speed corresponds to several times the maximum motor speed, somewhat lower speeds are obtainable by electrical control of the driving motor.

The lower end of the motor shaft 23 is keyed to spiral gear 38 that meshes constantly with a spiral gear 39 fixed to a shaft 40, which is rotatably mounted in suitable antifriction bearings 41 in the bearing supports 42. The teeth on the two spiral gears 38, 39 are such that the shaft 40 will be driven at the same speed as the motor shaft, although any desired ratio of speeds may be obtained by suitable design of the gear teeth. The shaft 40 is fixed by means of a suitable connection sleeve 43 to the left-hand end of a countershaft 44 provided below the spindle 12, as shown, being rotatably mounted in suitable antifriction bearings 45 in the bearing supports 46 of the headstock. Fixed on the countershaft 44 are two gears 47 and 48, gear 47 meshing constantly with a gear 49 that rotates freely on the spindle, being supported thereon by suitable antifriction bearings 50. Gear 48 meshes constantly with a gear 51 rotatable freely on the spindle, being supported thereon by means of suitable antifriction bearings 52. Either one of the gears 49 or 51 may be clutched to the spindle when the clutch teeth 33 and 34 of the speed step-up drive are out of engagement. As shown the means for connecting either gear 49 or gear 51 to the spindle is a clutch sleeve 55 splined on the spindle 12 and adapted to be moved either to the right or left by a suitable clutch collar engaging the clutch sleeve 56. When moved to the right, clutch teeth 57 engage clutch teeth 58 provided on a clutch ring 59 fixed to the gear 51. The spindle 12 is thus driven at its lowest speed with relation to the motor shaft through the small gear 48, countershaft 44 and the worm 38 and worm wheel 39. When the clutch sleeve 55 is moved to the left, clutch teeth 60 on the left end of the clutch sleeve engage clutch teeth 61 on a clutch ring 62 fixed to the gear 49. This provides for operation of the spindle 12 at intermediate speed.

It will thus be apparent that the spindle may be driven either through a rather direct connection at high speed when the shaft 16 is operated, from the worm wheel 28 and the worm 29; or may be driven at lower speeds when the worm wheel 28 is disengaged from the motor shaft, this drive being then through the countershaft, spiral gear 38, and spiral gear 39. This construction provides a very simple means for obtaining the several speeds desired, and provides for the transmission of the tremendous forces that are required in large lathes of the character with which this case is especially concerned.

A gear 65 is keyed to the countershaft 44 but is normally ineffective and out of mesh with the gear 66 on the right-hand end of the shaft 16. When using a direct current type of motor, the speed of which may be readily changed through electrical resistances, the gear 65 is not employed. However in order to adapt the gear drive to alternating current motors, gears 65 and 66 are used to obtain a still further speed variation of the spindle, by moving gear 66 to the left by means of a suitable shifting collar cooperating with the groove 67. The sleeve 68 however is first removed entirely from the machine when adapting it to an alternating current motor drive so that the gear 66 may be moved to the left, which movement also unclutches the connection 18 to permit shaft 16 to operate at a speed different from the spindle speed. At this time the connection sleeve 43 may be disconnected so as to uncouple the shafts 40 and 44. Thus the countershaft 44 may be driven from the shaft 16 through gears 66 and 65 so as to operate the spindle through either the gear train 47, 49 or gear train 48, 51 at different speeds. The shaft 16 may also be coupled directly by clutch 18 to the spindle shaft 12.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a lathe, a drive motor having a vertical shaft, a headstock, a horizontal work spindle rotatably mounted on said headstock, worm and worm gear drive means between said motor shaft and spindle to drive the spindle at a speed greater than motor speed, a shaft operated by said motor and extending parallel to said spindle, and means connecting said shaft and spindle for driving the spindle at lower speed.

2. In a machine tool, a head stock, a spindle adapted to be rotated at various speeds rotatably mounted in said head stock, a worm fixed on said spindle, a worm gear meshing with said worm, the worm and worm gear being such as to cause the rotation of the spindle at speeds greater than the worm gear speeds, an electric motor for operating said worm gear, and additional drive means independent of said worm and worm gear between said motor and said spindle for operating the spindle at lower speeds.

3. In a machine tool having a spindle adapted to be rotated at various speeds, a worm fixed to said spindle, a worm gear meshing with said worm, the worm and worm gear being such as to cause the rotation of the spindle at speeds greater than the worm gear speeds, an electric motor having a shaft operating said worm gear, an auxiliary shaft parallel to said spindle, intermediate and low speed gearing on the auxiliary shaft and on the spindle selectively operable to drive the spindle at intermediate and low speeds, clutch means for selecting the intermediate and low speed gearing, a driving connection from said auxiliary shaft to said motor shaft, and clutch means for disconnecting the worm gear from the motor shaft.

4. In a machine tool of the character described having a horizontal spindle adapted to be rotated at various speeds, a worm fixed to said spindle, a worm gear meshing with said worm, the worm and worm gear being such as to cause the rotation of the spindle at speeds greater than the worm gear speeds, an electric motor having a vertical shaft supporting said worm gear, clutch means for connecting and disconnecting said motor shaft and said worm gear, an auxiliary shaft parallel to said spindle, intermediate and low speed gearing on the auxiliary shaft and on the spindle selectively operable at intermediate and low speeds, clutch means for selecting the intermediate and low speed gearing, and a worm and worm gear driving connection from said motor shaft to said auxiliary shaft.

5. In a machine tool, a head stock, a spindle adapted to be rotated at various speeds rotatably mounted in said head stock, a worm fixed on said spindle, a worm gear meshing with said worm, the worm and worm gear being such as to cause the rotation of the spindle at speeds greater than the worm gear speeds, an electric motor for operating said worm gear, a driven gear rotatably mounted on said spindle, an antifriction bearing between said spindle and gear, means for clutching said gear to said spindle, a counter-shaft, a gear on said counter-shaft meshing with said driven gear, and means independent of said worm and worm gear and provided between said motor and said counter-shaft for operating said spindle at lower speeds.

LYNDON C. COLE.